UNITED STATES PATENT OFFICE.

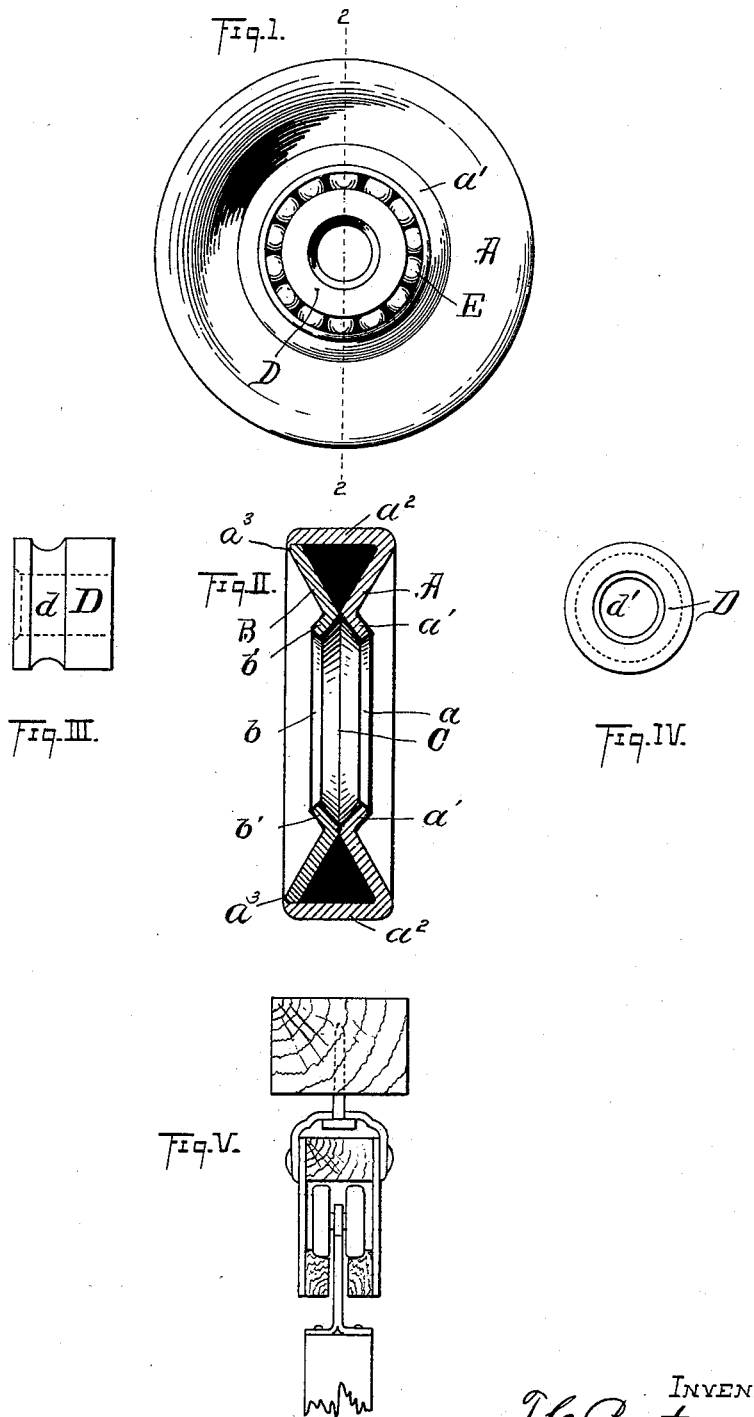

THEODORE C. PROUTY, OF MIDLAND, MICHIGAN.

BALL-BEARING ROLLER FOR DOOR-HANGERS.

SPECIFICATION forming part of Letters Patent No. 613,602, dated November 1, 1898.

Application filed July 10, 1896. Serial No. 598,674. (No model.)

*To all whom it may concern:*

Be it known that I, THEODORE C. PROUTY, a citizen of the United States, and a resident of Midland, county of Midland, and State of Michigan, have invented certain new and useful Improvements in Door-Hanger Wheels, of which the following is a specification, the principle of the invention being herein explained and the best mode in which I have contemplated applying that principle so as to distinguish it from other inventions.

The annexed drawings and the following description set forth in detail certain mechanism embodying the invention, such disclosed means constituting but one of various mechanical forms in which the principle of the invention may be used.

In said annexed drawings, Figure I represents a front elevation of my improved door-hanger wheel. Fig. II represents a vertical cross-sectional view taken upon line 2 2 in Fig. I. Fig. III represents a side elevation of the hub; Fig. IV, a front elevation of the same. Fig. V represents a section of a door-hanger track and support, showing a door-hanger in end elevation thereon, illustrating one form of hanger in which my improved wheel may be used.

Two steel disks A and B are each stamped with a central circular opening $a$ and $b$, respectively, of equal diameter, and are each formed with inclined flanges $a'$ and $b'$, respectively. Said disks are caused to project inwardly around said openings, and said projecting portions are adapted to rest against each other. That part of the disks between the inwardly-projecting portions and the edge of the openings is thereby adapted to form an outer ball-raceway C for receiving the balls E. The one disk A is formed with a flange $a^2$, drawn at right angles to the plane of the wheel, and is of a length such that it slightly overlaps the outer edge of disk B, which is made to fit inside of said flange $a^2$. The outer edge $a^3$ of flange $a^2$ is turned over and spun down upon the edge of the disk B, the inwardly-projecting portions resting one upon the other. Such interlocking of the two disks binds them tightly together in a rigid structure.

In order to give the wheel sufficient width of tread without unduly increasing the width of the ball-raceway C, the outer portion of each disk is made to flare outwardly, as shown.

A hub D, of smaller diameter than that of the central opening of the wheel, is formed with a peripheral groove $d$, forming a raceway adapted to receive the balls E and in conjunction with the raceway C form a complete ball-race for said balls. The said hub is provided with a central bore $d'$, through which may be inserted or driven a supporting pin or shaft. The provision of such bore and independent shaft permits of the use of a hard-steel and practically indestructible hub.

In assembling the wheel the balls are placed in the ball-raceway $d$, and the portion of the raceway C of one of the disks before the other disk is placed in position. The said other disk then being placed in position, the edges of said two disks are then interlocked and the balls permanently confined, it being impossible to remove them without taking down the whole wheel structure. This effectually prevents the loss of any of the balls, and hence greatly adds to the length of life of the wheel.

Fig. V illustrates one form of hanger and track in which my improved wheel may be used.

I therefore particularly point out and distinctly claim as my invention—

1. The combination of a wheel consisting of two metal disks each formed with a central opening and projecting inwardly near said openings, the outer edges of said disks adapted to interlock and the inwardly-projecting portions thereof adapted to rest against each other, a suitable shaft or hub, and balls, the wheel portion between said openings and said inwardly-projecting portions, adapted to form a raceway for said balls, substantially as set forth.

2. The combination of a roller-wheel consisting of two metal disks each formed with a central opening and projecting inwardly near said opening, the outer edges of said disk adapted to interlock and the inwardly-projecting portions adapted to rest against each other, whereby a raceway is formed around the said openings; a hub adapted to enter said openings and provided with a peripheral depression adapted, in conjunction with the raceway in said wheel, to form a ball-race; and balls adapted to bear in said ball-race, substantially as set forth.

3. The combination of a roller-wheel consisting of two metal disks each formed with a central opening and projecting inwardly near said opening, whereby outwardly-flaring flanges are formed, the outer edges of said disks adapted to interlock and the inwardly-projecting portions adapted to rest against each other, whereby said flanges form the walls of a raceway in said wheel; a hub adapted to enter said central openings and provided with a peripheral groove adapted in conjunction with said raceway in said wheel to form a ball-race, said hub formed with a bore adapted to receive a supporting-pin; and balls adapted to bear in said ball-race, substantially as set forth.

In testimony that I claim the foregoing to be my invention I have hereunto set my hand this 16th day of June, A. D. 1896.

THEODORE C. PROUTY.

Witnesses:
GEO. B. STANFORD,
Mrs. T. C. PROUTY.